Dec. 31, 1968  E. J. JOHNSTON ET AL  3,418,795
COMBINATION MOWER AND CROP PROCESSING APPARATUS
Filed Oct. 20, 1965  Sheet 2 of 2
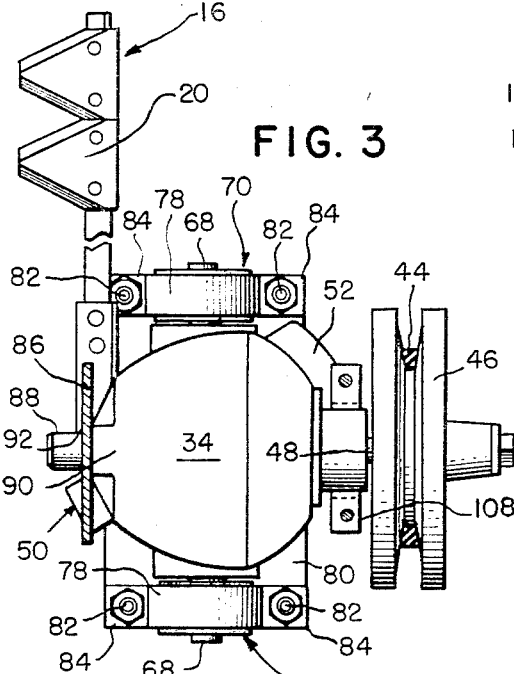
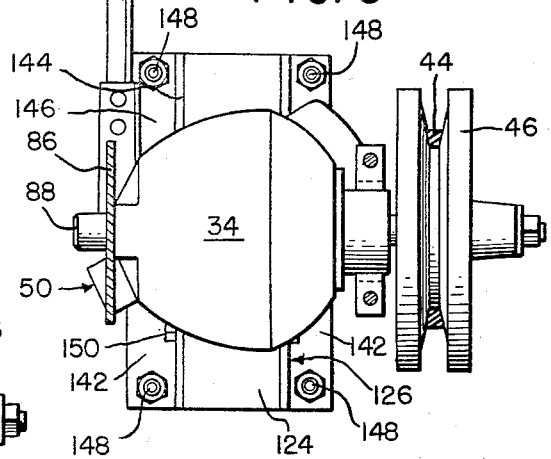
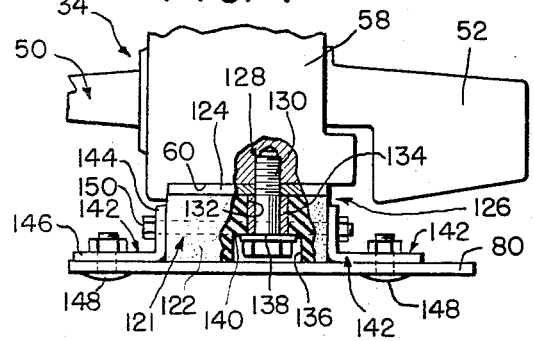
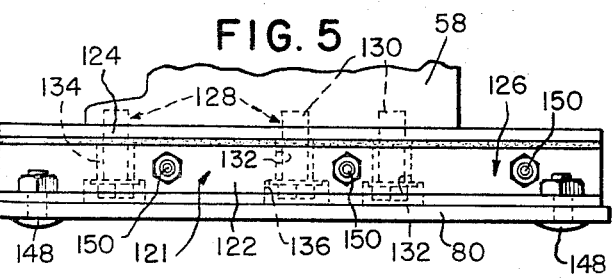
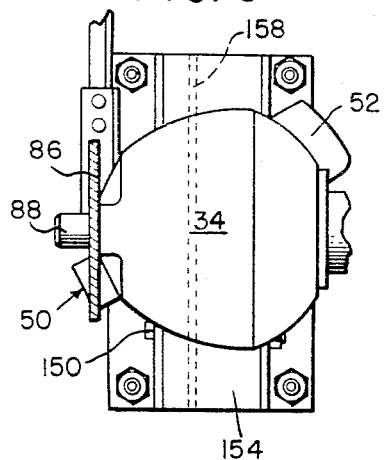
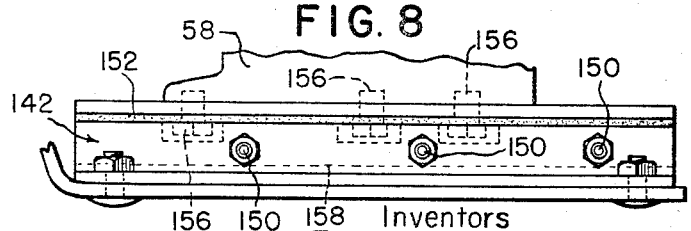
Inventors
Edward J. Johnston
Peter J. Peacock
Frank J. Macha, Jr.
John J. Kowalik
Attorney United States Patent Office
3,418,795
Patented Dec. 31, 1968

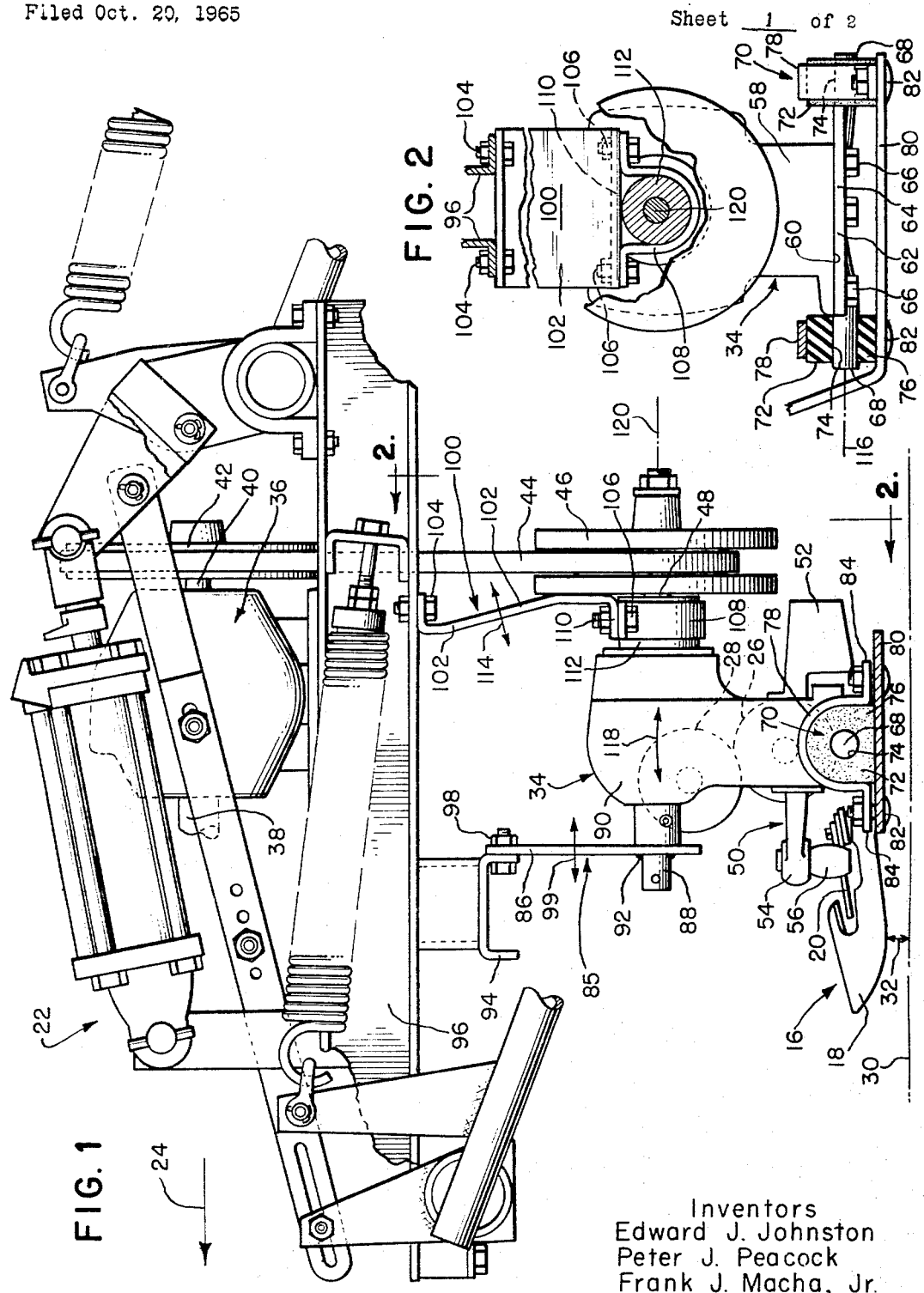

3,418,795
COMBINATION MOWER AND CROP
PROCESSING APPARATUS
Edward J. Johnston, La Grange, Peter J. Peacock, Western Springs, and Frank J. Macha, Jr., Chicago, Ill., assignors to International Harvester Company, Chicago, Ill., a corporation of Delaware
Filed Oct. 20, 1965, Ser. No. 498,798
19 Claims. (Cl. 56—25)

ABSTRACT OF THE DISCLOSURE

A harvester having a frame and a sickle reciprocal thereof, a motion conversion unit driving the sickle, and a vibration absorbing mounting for the unit adjacent to the sickle comprising an elastomer support for the unit from the frame and an additional yieldable element connected between the unit and the frame oriented to resist movements of the unit in lateral directions.

---

The present invention relates to a combination mower and crop processing apparatus.

A broad object of the invention is to provide a construction for absorbing and minimizing vibration of the sickle member and correspondingly minimizing the transmission of such vibration from the member to the means on which it is supported.

The invention is applicable to any of a wide range of apparatus or mechanism wherein such vibration is encountered. The invention is particuarly adaptable to certain agricultural implements and the latter is utilized in the present disclosure as an application of the invention. Among agricultural implements, the mower involves as much vibration as most other agricultural implements, the vibration being caused by a reciprocating sickle. Such vibration often is very severe and of very high frequency such as in a combination mower and crusher to be referred to again hereinbelow. In such implement the mower bar incorporating the reciprocating sickle is suspended above the ground and as a result none of the vibration of the mower bar is absorbed by the ground, as was done to substantial degree in previous forms of mower in which the mower bar rides directly on the ground.

Another and broad object of the invention is to provide anti-vibration construction particularly adaptable to apparatus of the foregoing general character.

A further object is to provide anti-vibration construction which includes an intermediate unit for converting uni-directional motion to alternately opposite motion, such as reciprocation or oscillation, and means for mounting the unit for absorbing vibration therefrom including multiple point support thereof.

Still another object is to provide construction of the foregoing character which includes resilient means for mounting a motion conversion unit on a frame which includes at least one element supporting the unit vertically, and at least one additional element yieldably resisting movements of the unit in directions other than vertical.

An additional object is to provide construction of the foregoing general character which includes a motion converting unit and resilient means mounting it at a plurality of points for absorbing vibration therefrom, and wherein the mounting means includes elements distributed in a novel manner according to the characteristics of the vibration imparted to the unit resulting from the conversion of the motion.

A more specific object is to provide anti-vibration construction including a unit for converting uni-directional rotary motion to reciprocating motion and resilient mounting means including elements at a plurality of points of support of the unit arranged in a novel manner to effectively absorb the vibrations imparted to the unit resulting from the reciprocating motion.

A still further object of the invention is to provide, in a combination mower and crop processing apparatus in which a mower bar is incorporated and maintained in elevated position above the ground in the normal operation of the apparatus, and in which the mower bar includes a reciprocating sickle and the implement also includes means for imparting uni-directional rotary motion, and a unit for converting such motion to reciprocating motion and transmitting it to the sickle, novel resilient means supporting the anti-vibration unit at a plurality of points in the implement for absorbing a substantial amount of the vibration imparted to the unit by the reciprocating sickle.

Other objects and advantages of the invention will appear from the following detailed description taken in conjunction with accompanying drawings wherein:

FIGURE 1 is a fragmentary view, from the side, of an agricultural implement embodying the construction of the present invention and showing the relation between that construction and the implement as a whole;

FIGURE 2 is a view partially in elevation and partially in section of the construction of the invention, oriented according to line 3—3 of FIGURE 1;

FIGURE 3 is a top view of the construction shown in FIGURE 2;

FIGURE 4 illustrates a modified form of construction, being partially in elevation and partially in section, and oriented according to the lowermost portion of FIGURE 1;

FIGURE 5 is a view from the right of FIGURE 4;

FIGURE 6 is a top view of the construction shown in FIGURES 4 and 5 and including the complete motion converting unit;

FIGURE 7 is a view similar to FIGURE 4 but showing a further embodiment of the invention;

FIGURE 8 is a view from the right of FIGURE 7; and

FIGURE 9 is a top view of the construction shown in FIGURES 7 and 8 and including the complete motion converting unit.

Referring now in detail to the accompanying drawings, attention is directed first to FIGURE 1 showing certain portions of an agricultural implement in which the construction of the present invention is incorporated. Such implement is disclosed and claimed in the co-pending application of Edward J. Johnston et al., Ser. No. 439,588, filed Mar. 15, 1965, for Method for Harvesting and Apparatus Therefor. The implement disclosed in that application, and partially illustrated here, includes a combination mower and crusher. The mower feature of the implement includes a mower bar 16 which extends transversely across the implement, or in the direction of view of the observer of FIGURE 1. The mower bar may be of any desired construction and includes a plurality of guards 18 and a sickle 20. The implement, identified generally at 22, in its normal operation moves to the left as viewed in FIGURE 1, as indicated by the arrow 24. Associated with the mower bar 16 is a pair of rollers 26 and 28, these rollers being disposed to the rear of the mower bar and arranged for receiving therebetween the hay or grass cut by the mower bar, and crushing it. The detail construction and arrangement of these rollers, together with their relation to the mower bar, is fully set out in the copending application referred to above and it is believed unnecessary to go into the detail description thereof herein. In such construction, in accordance with the effective operation of the implement, the mower bar is maintained in spaced relation above the ground, the ground being indicated by the dot-dash line 30 and the space at which the mower bar is held thereabove being indicated by the double headed arrow 32. In mowers as heretofore known, i.e., those without additional processing features, the mower bar rides directly on the ground and as a result thereof a substantial amount of the vibration of the mower bar and sickle therein is absorbed by the ground and is not transmitted back to other parts of the implement, but in the present instance where the mower bar is maintained above the ground as mentioned, all of the vibration is transmitted back to other parts of the implement and the construction of the present invention is specially designed to absorb such vibration and to eliminate or greatly minimize the transmission of that vibration to other parts of the implement.

The implement includes a mower head 34, which is also designated a motion converting unit or component. This mower head or unit is preferably substantially of the character disclosed and claimed in Orelind Patent No. 2,824,416 issued Feb. 25, 1958. This mower head or unit is effective for converting uni-directional motion into other motion such as reciprocating or oscillating motion, and specifically for converting uni-directional rotary motion into reciprocating motion, and in this case converting such uni-directional rotary motion that is derived from the prime mover of the implement into reciprocating motion and transmitting it to the sickle 20.

The implement includes suitable drive transmitting means such as a gear box 36 which has an input shaft 38 adapted for connection to a suitable power source such as the power take-off shaft of the tractor drawing the implement. The gear box has an output shaft 40 on which is secured a pulley 42 on which is trained a belt 44 also trained over another pulley 46 mounted on the input shaft 48 of the mower head or motion converting unit 34. The unit 34 includes an output member 50 arranged for oscillating or rocking movement, having a counterweight 52 at a rear end and an extension or arm 54 at its forward end pivotally connected through an element 56 with the sickle 20 identified above. The drive from the gear box 36 is uni-directionally rotary, which is transmitted through the belt 44, pulley 46, and certain internal elements of the unit 34 and converted thereby to the reciprocating or oscillating movement of the arm 50, resulting in reciprocating movement of the sickle 20 in the manner referred to above.

Attention is now directed to the lowermost portion of FIGURE 1, and to FIGURES 2 and 3 for the details of a first form of the construction of the invention for absorbing or minimizing the vibration of the unit 34.

The mower head or unit 34 includes a base 58 of suitable construction having a lower surface 60 preferably of planar form. Secured to the surface 60 is a mounting member 62 having a central portion 64 preferably in the form of a plate fitted to the surface 60 and secured to the base 58 by suitable means such as bolts 66 extending through apertures in the member 62 and threaded into tapped holes in the base. The member 62 includes extensions 68 extending laterally beyond the base and mounted in resilient mounting means indicated generally at 70. Each mounting means 70 includes a member 72 of rubber or rubber-like or elastomer material having suitable resiliency characteristics. These elements 72 are provided with apertures 74 receiving the extensions 68, having a lower portion 76 below the extensions. U-shaped clamps 78 are fitted over the resilient elements 72 and secured to a bottom frame element 80 as by bolts 82 extending through the bottom element 80 and through lugs 84 extending outwardly from the main portion of the U-shaped clamp and fitted to the bottom element 80. The bottom element 80 is a part of the overall framework of the implement and constitutes an integrated and rigid portion of that framework and thereby transmits to the framework any vibration transmitted to that element, such as from the mower head or unit 34. It will be of course understood that the only effective engagement between the member 62 and the bottom element 80 is through the resilient elements or members 72.

Another element of the resilient means for mounting the unit 34 as indicated in its entirety at 84 and includes a flat, plate-like link 86 receiving a stub shaft 88 secured in the housing 90 of the mower head. The stub shaft 88 is preferably welded to the link 86 as indicated at 92. The upper end of the link 86 is secured to a frame element 94 which in turn is secured to a beam 96 also constituting a part of the frame. The means for securing the link 86 to the frame includes bolt means 98 which provides a degree of flexibility between the link and the frame. The link 86 also is in itself flexible, in directions transverse to its thickness, or in arcuate directions as viewed in FIGURE 1 and indicated by the double headed arrow 99.

A third element of the flexible means for mounting the mower head or unit 34 to the frame is indicated in its entirety at 100 and includes Z-shaped link 102, generally plate-like in form, having one end secured to the frame member 96 as by bolt means 104 and its other end secured as by bolt means 106 to clamp means including a U-shaped clamp 108 and a yoke 110 secured together by the bolts 106, clamping the elements 108 and 110 around bearing means 112 mounted in the frame 90 of the unit journalling the input shaft 48 identified above.

The link 102 provides a limited degree of flexibility in directions transverse to its thickness, or in the directions of the double-headed arrow 114. The link 102 is symmetrical so that it can be put in position indiscriminately in either of opposite directions, whereby to facilitate assembly operations.

The mounting elements 70, 84 and 100 provide a multiple point mounting of the unit 34 on the frame of the implement. These mounting elements provide universal resiliency in all directions. The bottom element 80 supports the unit 34 vertically and absorbs vertical vibrations, as well as others, namely oscillatory or rocking movements about the axis of the extensions 68, this axis being indicated by the dot-dash line 116. These mounting elements also accommodate shifting of the unit 34 longitudinally along the axis 116. Additionally, the mounting elements accommodate vibratory movements of the mounting element 62 in horizontal direction, as well as vertical movements, and thus universally in all directions transverse to the axis 116.

The resilience or flexibility of the links 86 and 102 in directions indicated by the arrows 99 and 114, accommodate vibratory movements of the unit 34 about the axis 116, as indicated by the arcuate double headed arrow 118 (FIGURE 1). The various forces affecting the unit 34 tend to cause vibration or oscillatory movements also about the axis of the input shaft 48 as indicated by the dot-dash line 120 (FIGURE 1). These movements are accommodated by the resilient mounting elements 70. The flexibility provided in the connection between the link 86 and frame element 94 accommodates additional vibratory movements of the unit. The connection between the clamping elements 108 and 110 (FIGURE 2) with the bearing means 112 of the input shaft of the unit, additionally accommodates vibratory movements in rotary direction about the axis 120.

Attention is next directed to FIGURES 4, 5 and 6 showing a modified form of the invention. In the present instance the mounting elements 84 and 100 described above are utilized in the same form, but the means for supporting the unit 34 on the bottom frame element 80 are of different character. In the present instance a mounting arrangement indicated generally at 120 is utilized. In this mounting arrangement a block 122 of rubber or rubber-like material having suitable resiliency characteristics is bonded to a metal plate 124 fitted to the under surface 60 of the base 58 of the unit. The unit including the block 122 and plate 124, now identified as 126, is secured to the base 58 by bolt means 128 which preferably includes a plurality of bolts 130. Each bolt is extended through an aperture 132 in the rubber block and threaded into a tapped hole in the base of the unit 34; surrounding the shank of the bolt is a spacer sleeve 134, the aperture 132 being dimensioned to receive the sleeve. The aperture 132 is provided with a counter bore 136 receiving the head of the bolt and a washer 138 which engages a shoulder 140 between the small portion of the bore and the counter bore. Tightening of the bolts 130 into the tapped holes of the base of the unit 34 clamps the unit 126 securely against the base 58.

The unit 126 is clamped in position by side clamps 142 having vertical legs 144 engaging the sides of the rubber block 122 and horizontal legs 146 engaging the bottom element 80. Bolt means 148 secure the legs 146 to the bottom element 80, and bolt means 150 extend through the vertical legs 144 and transversely through the block 122. The block 122 and thus the unit 126 is thus securely mounted to the bottom frame element 80.

The block 122 provides damping effect to the mower head or unit 34 in all directions described above in connection with the units 70 of FIGURES 2 and 3. Preferably the block 122 extends the full transverse extent of the base 58 as shown in FIGURE 5, and may extend therebeyond as also indicated in the latter figure.

Attention is next directed to FIGURES 7, 8 and 9 showing a third embodiment of the invention. In this case, similarly to the second embodiment, the elements 84 are 100 of the mounting means for the unit 34 are the same as in the first embodiment. In the present instance the means for mounting the unit on the bottom frame element 80 differs from the corresponding mounting elements described above. In the present embodiment, a block 152 of rubber or rubber-like material having suitable resiliency characteristics is provided, but the present arrangement eliminates the necessity for bonding between the rubber block and the plate thereabove. In the present instance such a plate 154 is detachably secured to the base 58 as by bolts 156. Secured to the plate 154 is a downwardly extending plate element 158 secured thereto as by welding. Preferably the plate 154 extends transversely an extent similar to that referred to above in connection with FIGURES 4, 5, and 6 and as indicated in FIGURES 8 and 9, and the downwardly extending plate element 58 extends the full length of the plate 154. The bolts 150 referred to above for securing the block 152 to the bottom element 80 in this case not only extend through the block 152 but also through the plate element 158. The plate element 158 is provided with apertures 160, for receiving the bolts 150, of greater vertical extent than the diameter of the bolts to accommodate relative vertical movement therebetween. Thus, the mounting plate 154 and the unit 34 are secured against separation upwardly by the plate element 158 and bolts 150, while their downward and vibratory movements are supported or accommodated by the block 152. The present construction eliminates the necessity for bonding between the block 152 and the plate 154 while still providing the desired securement between those elements and between the block and the base 58 of the unit 34. The present arrangement accommodates vibratory movements in all directions in the same manner as described above in connection with the first embodiment.

While we have shown and described herein certain preferred forms of the invention it will be understood that changes may be made therein within the scope of the appended claims.

We claim:

1. In a harvesting device, the combination comprising, a frame, a mounting, a driving member on the mounting, a driven member on the mounting operating in alternately opposite directions, a motion conversion unit interposed between the driving member and the driven member and operative for converting the uni-directional motion from the driving member into alternately opposite motion and transmitting it to the driven member, a sickle carried from the frame and operated by the driven member, and resilient means adjacent to said sickle mounting said motion conversion unit with the mounting on the frame for absorbing a substantial amount of vibration in the unit, including an element supporting in vertically from the frame, and at least one additional element between the mounting and the frame yieldingly resisting movement of the unit in directions other than vertical.

2. The invention set out in claim 1 wherein the uni-directional movement is rotary in character and the alternately opposite motion is reciprocating motion.

3. The invention set out in claim 1 wherein the motion conversion unit includes a base portion and an input shaft with a pulley thereon offset from the base portion, the pulley is adapted for cooperation with a driving belt for imparting uni-directional rotary movement to the pulley, and the resilient means for mounting the unit includes means enabling vibratory movement of the base portion of the unit transversely of the axis of said input shaft.

4. In a harvester, a frame, a driving member on the frame operating in a single direction, a driven member on the frame operating in alternately opposite directions, a motion conversion unit interposed between the driving member and the driven member including a rotary input shaft and operative for converting the uni-directional motion from the driving member into alternately opposite motion and transmitting it to the driven member, a sickle mounted on the frame connected with said driven member and resilient means mounting said motion conversion unit on the frame adjacent to the sickle for absorbing a substantial amount of vibration in the unit, including an element supporting the unit vertically and yieldingly resisting vibratory motion transverse to the axis of said input shaft, and additional elongated elements yieldingly resisting movement in direction other than vertical, said additional elements being elongated and flexible in direction transverse to their long direction.

5. A mower and crop treating implement comprising, a frame, a driving member on the frame operating in a single direction, a driven member on the frame operating in alternately opposite directions, a motion conversion unit having a base portion interposed between the driving member and the driven member and operative for converting the uni-directional motion from the driving member into alternately opposite motion and transmitting it to the driven member, and resilient means mounting said motion conversion unit on the frame for absorbing a substantial amount of vibration in the unit, including an element interposed between the base portion and said frame operative for accommodating vibratory motion of the base portion in universal directions, a plurality of additional elements at points displaced from the base and operative for accommodating limited vibratory motion in directions about an axis through the base mounting means, said additional elements including a pair of elements spaced along a second axis disposed transverse to the axis of the base mounting elements and operative for accommodating vibratory motion about said second axis.

6. A combination mower and crop processing apparatus comprising a frame, a reciprocating sickle mounted on the frame in spaced relation above the ground and free of engagement therewith, a uni-directional rotary driving member on the frame, a motion conversion unit interposed between the driving member and the sickle and operative for converting the uni-directional motion from the driving member into reciprocating motion and transmitting it to the sickle, said motion conversion unit including a base portion having a pair of lateral extensions, and resilient means mounting said motion conversion unit on the frame adjacet to the sickle for aborbing a substantial amount of vibration thereof including resilient elements receiving said extensions for movement therein in universal directions and supporting the unit vertically, and at least one additional element yieldingly resisting motion of the unit in directions other than vertical.

7. An implement of the character disclosed comprising, a frame, driving means on the frame adapted for uni-directional motion, a working member mounted on the frame adapted for operating in reciprocatory motion, a motion conversion unit having a base interposed between the driving member and the working member and operative for converting the uni-directional motion to reciprocatory motion and transmitting it to the working member, and means mounting the motion conversion unit on the frame including an element supporting the base of the unit and having an axis transverse to the unit, and a pair of additional mounting elements adjacent the upper portion of the unit connected between the unit and fixed elements of the frame, said additional elements being flexible in directions generally transverse to said axis in the base portion whereby to accommodate vibratory motion of the upper portion of the unit in generally arcuate directions about that axis.

8. The invention set out in claim 7 wherein the additional mounting elements include straps generally in plate-like form and the flexibility thereof is effective in directions generally transverse to the thickness direction of the elements.

9. The invention set out in claim 8 wherein said additional mounting elements include one strap secured at one end to the unit and connected at its other end with a limited degree of flexibility to the frame.

10. The invention set out in claim 7 wherein the additional mounting elements include straps generally in plate-like form and flexible in directions generally transverse to the thickness direction thereof, said motion conversion unit includes a rotary input shaft, one of said straps is secured about said input shaft, and accommodates vibratory motion of the unit about the axis of said shaft.

11. The invention set out in claim 7 wherein the additional mounting elements include straps generally in plate-like form and the flexibility thereof is effective in directions generally transverse to the thickness direction of the elements, one of said straps is symmetrical end-for-end whereby it may be mounted in position indiscriminately end-for-end.

12. The invention set out in claim 7 wherein the additional mounting elements include straps generally in plate-like form and the flexibility thereof is effective in directions generally transverse to the thickness direction of the elements, said straps are so relatively positioned as to accommodate vibratory motion of the unit in the same general directions.

13. An implement of the character disclosed comprising, a frame, a driving member on the frame operating in a single direction, a driven member on the frame operating in alternately opposite directions, a motion conversion unit interposed between the driving member and the driven member and operative for converting the uni-directional motion from the driving member into alternately opposite motion and transmitting it to the driven member, a sickle mounted on the frame connected with the driven member, said unit having a base, and resilient means mounting said unit on the frame adjacent to said sickle for absorbing a substantial amount of vibration thereof, including a resilient block between said base and the frame extending substantially the full transverse dimensions of the base and constituting effectively the sole means supporting the unit vertically on the frame, and at least one additional element connected between the unit and the frame yieldingly resisting movement in directions other than vertical.

14. The invention set out in claim 13 wherein means is provided confining the resilient block against transverse displacement in directions along at least one transverse line.

15. The invention set out in claim 13 wherein means is provided confining the resilient block against transverse displacement in directions along at least one transverse line, said confining means including brackets on opposite sides of the resilient block and secured to the frame, and bolts extending transversely through said brackets and through the resilient block.

16. In a harvester, a frame, a driving member on the frame operating in a single direction, a driven member on the frame operating in alternately opposite directions, a motion conversion unit interposed between the driving member and the driven member and operative for converting the uni-directional motion from the driving member into alternately opposite motion and transmitting it to the driven member, said unit having a base, and resilient means mounting said motion conversion unit on the frame adjacent to the sickle for absorbing a substantial amount of vibration thereof, including a mounting unit interposed between said base and the frame, said mounting unit including a block of resilient material and a top plate bonded thereto, means securing the motion conversion unit to said mounting unit including bolts extending through apertures in the mounting unit and threaded to the base, and means for securing the mounting unit to the frame including brackets secured to the frame and bolts extending transversely through the brackets and the mounting unit.

17. An implement of the character disclosed comprising a frame, a uni-directional rotary driving member on the frame, a reciprocable driven member on the frame, a motion conversion unit interposed between the driving member and the driven member and operative for converting the rotary motion from the driving member into reciprocating motion and transmitting it to the driven member, a sickle connected with the driven member for movement thereby, said unit having a base, and resilient means mounting said unit on the frame adjacent to said sickle for absorbing a substantial amount of vibration thereof, including a unit interposed between said base and the frame, said mounting unit including a block of resilient material and a top plate bonded thereto and directly engaging the base of the motion conversion unit, securing means including bolts extending through apertures in the mounting unit and threaded to the base, the apertures in said mounting unit including a small bore portion and a counter bore, said bolts having heads received in the counter bores, spacer sleeves positioned about the shanks of the bolts within the smaller portion of the bores, and washers interposed between the heads of the bolts and the shoulders in the bores between the counter bores and the smaller portions of the bores, and means securing the mounting unit to the frame including brackets secured to the frame and bolts extending through the brackets and transversely through the mounting unit.

18. A harvester comprising, a frame, a uni-directional rotary driving member on the frame, a reciprocable driven member on the frame, a motion conversion unit interposed between the driving member and the driven member and operative for converting the uni-directional rotary motion from the driving member into reciprocating motion and transmitting it to the driven member, a sickle connected thereto for actuation thereby, said unit having a base, and resilient means mounting said unit on the frame adjacent to the sickle for absorbing a substantial amount of vibration thereof including a first element supporting the unit vertically, and at least one additional element connected between the unit and frame yieldingly resisting motion in directions other than vertical, said first element including a resilient block between said base and the frame extending substantially the full transverse dimensions of the base and constituting effectively the sole means supporting the unit vertically on the frame, and a vertical plate element secured to the base extending downwardly into a recess in the resilient block, and means detachably securing the resilient block to the frame.

19. An implement of the character disclosed comprising, a frame, a uni-directional rotary driving member on the frame, a reciprocatory driven member on the frame, a motion conversion unit interposed between the driving member and the driven member and operative for converting the rotary motion from the driving member into reciprocating motion and transmitting it to the driven member, a sickle connected to the driven member for reciprocation thereby, the unit having a base, and resilient means mounting said unit on the frame adjacent to the sickle for absorbing a substantial amount of vibration thereof including a resilient block between said base and the frame and supporting the unit vertically, a top plate interposed between the resilient block and said base and detachably secured to the base, a vertical plate element depending from the top plate and extending downwardly into a recess in the resilient block, and transverse bolts extending through the block and said vertical plate element and secured to the frame.

References Cited

UNITED STATES PATENTS

| | | | |
|---|---|---|---|
| 2,709,328 | 5/1955 | Schroeppel | 56—25 |
| 2,895,278 | 7/1959 | Huddle et al. | 56—25 |
| 3,302,376 | 2/1967 | Scarnato et al. | 56—25 |

ANTONIO F. GUIDA, *Primary Examiner.*

U.S. Cl. X.R.

56—1